United States Patent [19]

Schuh

[11] 4,265,966
[45] May 5, 1981

[54] METHOD OF USING NITROGEN-CONTAINING POLYESTER RESINS AS EPOXY RESIN HARDENING ACCELERATORS IN WINDING BANDS FOR HIGH-VOLTAGE INSULATION OF ELECTRIC MACHINES AND APPARATUS AND MICA TAPE THEREFOR

[75] Inventor: Heinz Schuh, Dinslaken, Fed. Rep. of Germany

[73] Assignee: Kraftwerk Union AG, Mülheim, Fed. Rep. of Germany

[21] Appl. No.: 104,971

[22] Filed: Dec. 18, 1979

[30] Foreign Application Priority Data

Dec. 28, 1978 [DE] Fed. Rep. of Germany ....... 2856562

[51] Int. Cl.³ .................. B32B 5/16; B05D 5/12; H01B 13/06; B32B 19/00
[52] U.S. Cl. ................................ 428/324; 156/53; 427/120; 427/386; 428/363; 428/241; 528/291
[58] Field of Search .............. 428/324, 363, 241; 156/53; 427/120, 386; 528/291

[56] References Cited

U.S. PATENT DOCUMENTS

| 3,324,033 | 6/1967 | Knapp | 528/291 |
|---|---|---|---|
| 3,369,947 | 2/1968 | Mertens et al. | 156/53 |
| 3,470,045 | 9/1969 | Bronnvall et al. | 428/324 |
| 3,647,611 | 3/1972 | Mertens | 428/324 |
| 3,652,501 | 3/1972 | Albers et al. | 528/291 |
| 3,983,289 | 9/1976 | Nishizaki et al. | 428/324 |
| 3,998,983 | 12/1976 | Smith | 428/324 |

FOREIGN PATENT DOCUMENTS

| 1162898 | 2/1964 | Fed. Rep. of Germany . |
| 1219554 | 6/1966 | Fed. Rep. of Germany . |
| 1258937 | 1/1968 | Fed. Rep. of Germany . |
| 2215206 | 10/1972 | Fed. Rep. of Germany . |

*Primary Examiner*—William R. Dixon, Jr.
*Attorney, Agent, or Firm*—Herbert L. Lerner

[57] ABSTRACT

High-voltage insulation in which mica tape employing a binder resin is used for wrapping around electrical apparatus, and the wrapped apparatus is impregnated with a heat-setting epoxy resin. The binder resin for the mica tape is a polyester containing a tertiary-bound nitrogen which is effective as an adhesive for the tape and also as an accelerator for the epoxy resin.

24 Claims, 2 Drawing Figures

METHOD OF USING NITROGEN-CONTAINING POLYESTER RESINS AS EPOXY RESIN HARDENING ACCELERATORS IN WINDING BANDS FOR HIGH-VOLTAGE INSULATION OF ELECTRIC MACHINES AND APPARATUS AND MICA TAPE THEREFOR

BACKGROUND OF THE INVENTION

1. Field of the Invention

This invention relates to high-voltage insulation for electric conductors especially for the winding bars and coils of electric machines by wrapping mica tape around the electric conductor and impregnating the wrapped conductor with epoxy resin, and to the mica tape for wrapping the electric conductor.

2. Background of the Invention

In insulation technology, especially in connection with the high-voltage insulation, to be impregnated with hot-setting epoxy resin, of electric machines and apparatus, the problem of a storable and flexible synthetic-resin system which can be used at the same time as tape adhesives for wrapping tapes and as accelerators for the subsequent epoxy resin hardening exists. The high-voltage windings of electric machines and apparatus, including particularly turbo-generators, transformers or parts thereof, are wrapped for insulation with mica tape. For impregnating the wrapped or bandaged parts, large tanks with impregnating resins are used, into which the products to be manufactured are immersed. The quantity of resin consumed is small as compared to the quantity in the impregnating tank; it is replaced when necessary to replenish the resin. In this connection it is of great importance that the resin in the impregnating tank retain its properties as long as possible, including its viscosity, so that the same impregnating conditions can be used for every product to be impregnated, i.e., that the maintenance of the constant properties of the hardened resin does not take place at the expense of the desirable or applicable setting conditions. As the resin-hardening system, a hot-setting epoxy resin of the bi- or higher-functional glycidyl ether type or of the epoxy compound and acid anhydride type, the viscosity of which is less than 30 cP (at about 60° to 70° C.), is preferably used.

In insulation technology, the accelerator for the hardenable resin is incorporated for this purpose, according to the present state of the art (German published prosecuted application No. 1 219 554, German published prosecuted application No. 11 62 898), either by immersion of the carrier material into a solution of the accelerator or by incorporating the accelerator into the binder which acts as the adhesive between the top and bottom side of the wrapping tape. The accelerators incorporated into the adhesive resin are either accelerator resins of the epoxy resin type with tertiary-bound amine nitrogen, which serve at the same time as adhesive resins, or conventional epoxy resin hardening-accelerators of the tertiary amine type such as 4,4'-dimethyl-amino diphenyl methane (T-base) which are embedded in the adhesive resin.

The disadvantage of these depot resin systems is in the time-limited storage stability, caused by anionic polymerisation of the adhesive resin by the embedded tertiary amine. This polymerisation leads to hardening which impairs the wrappability of the insulating tape. With the accelerator resins of the epoxy resin type with tertiary-bound amine nitrogen, which are used in situ, application over an area is furthermore not possible because these resins are solid resins, so that impregnating the tape with the low-viscosity impregnating resin mixture of the epoxy resin type is difficult. It has been attempted to counter this difficulty by applying the accelerator resin spot-wise in an amount just sufficient for cementing (German published prosecuted application No. 2 215 206).

SUMMARY OF THE INVENTION

It is an object of the invention to provide a method for the manufacture of high-voltage insulation, to be impregnated with epoxy resin, of electric machines and apparatus, which avoids the difficulties described, i.e., in which the adhesive and accelerator resin is already contained in the mica tape but nevertheless aging or hardening of the mica tape or the impregnating resin mixture is avoided. A further object of the invention to provide an improved method in the manufacture of high-voltage insulation by wrapping and impregnation so that the flexibility, the reactivity and the consistency of the adhesive and accelerator resin used in the method can be controlled in a simple manner.

A still further object of the invention is to provide a new and improved mica tape containing a binder which serves as the adhesive and also as the accelerator for the epoxy resin mixture while retaining storage stability, flexibility and workability.

With the foregoing and other objects in view, there is provided in accordance with the invention a method for the manufacture of high-voltage insulation for electric machines and apparatus by wrapping a mica tape formed by adhering mica to a flexible support foil with a binder resin around the electrical equipment to be insulated and impregnating the electrical equipment having the mica tape wrapped around it with a heat-setting epoxy resin, the improvement comprising employing as said binder resin a polyester containing a tertiary-bound nitrogen which is effective as an adhesive for the tape and also as an accelerator for the epoxy resin.

In accordance with the invention there is provided a mica tape for manufacturing an insulating sleeve impregnated with a hot-setting epoxy impregnating resin mixture for electric conductors, especially for the winding bars and coils of electric machines formed of mica scales applied on a flexible support and cemented to the support and to each other by means of a binder serving as the adhesive and also as the accelerator for the epoxy resin mixture when impregnated with the epoxy resin mixture, said adhesive and accelerator binder being a polyester resin containing a tertiary-bound nitrogen as part of its molecular structure.

Other features which are considered as characteristic for the invention are set forth in the appended claims.

Although the invention is illustrated and described herein as embodied in a method of using nitrogen-containing polyester resins as epoxy resin hardening accelerators in winding bands for high-voltage insulation of electric machines and apparatus and mica tape therefor, it is nevertheless not intended to be limited to the details shown, since various modifications may be made therein without departing from the spirit of the invention and within the scope and range of equivalents of the claims.

BRIEF DESCRIPTION OF THE DRAWINGS

The invention, however, together with additional objects and advantages thereof will be best understood from the following description when read in connection with the accompanying drawings, in which.

Figure 1:
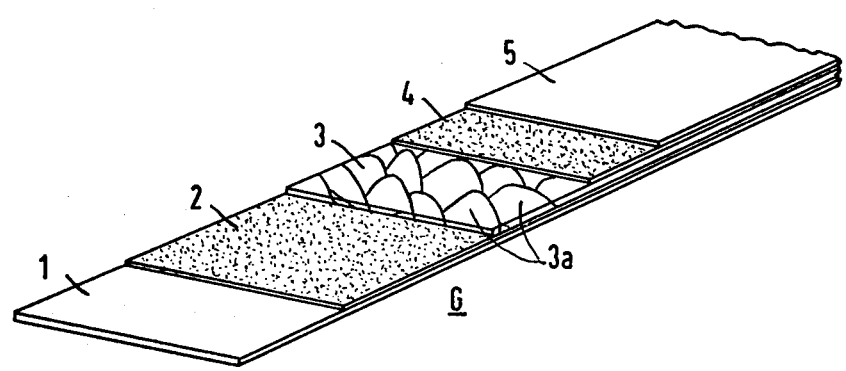
FIG. 1 diagrammatically shows a section of a mica tape in a perspective view, for which a polyester resin is used as an adhesive and accelerator resin, and FIG. 2, in a view corresponding to FIG. 1, shows the insulation sleeve of the winding bar of an electric machine which is wrapped with a mica tape according to FIG. 1.

In accordance with the invention, polyester resins containing tertiary-bound nitrogen as adhesive and accelerator resin are used in wrapping tapes containing mica for the high-voltage insulation, to be impregnated with a hot-setting epoxy resin of electric machines and apparatus. The polyester resins are obtained by condensation of equimolar amounts of a dicarbonic or dicarboxylic acid or a dicarbonic or dicarboxylic acid anhydride and a glycol containing tertiary-bound nitrogen, and distilling off the water produced in the condensation. As illustrative, adipic acid and N-methyldiethanolamine are mixed together and are pre-condensed at a temperature of at least 100° C. for hours, usually 4–7 hours, and the condensation water produced distilled off at 100° C. The desired reactivity of the polyester may be set or modified by replacing part of the glycol containing the tertiary-bound nitrogen by a nitrogen-free glycol. For example, part of the N-methyldiethanolamine is replaced by ethylene glycol. Also part of the adipic acid may be replaced by methylhexahydrophthalic acid anhydride.

Mica tape for manufacturing an insulating sleeve impregnated with a hot-setting epoxy impregnating resin mixture for electric conductors especially for the winding bars and coils of electric machines, consists of mica scales which are applied on a flexible support and are cemented to the support and to each other as well as, if applicable, to a terminating cover layer by means of a binder serving as the adhesive and accelerator resin. The adhesive and accelerator resin is a polyester resin which contains tertiary-bound nitrogen. The binder containing the tertiary-bound nitrogen is prepared in a manner as described above.

The dicarboxylic acid or its anhydride preferably is an aliphatic compound containing 4–12, more desirably 6–8, carbon atoms. The specific compound found in practice to give excellent results is adipic acid having the formula—COOH(CH$_2$)$_4$COOH. Other examples of dicarboxylic acids are:
succinic acid—COOH(CH)$_2$COOH
propane dicarboxylic acid—CH$_3$CH$_2$CH(CO$_2$H)$_2$
pimelic acid—COOH(CH$_2$)$_5$COOH
suberic acid—COOH(CH$_2$)$_6$COOH Diols are aliphatic compounds containing 2—OH groups. Glycols—a group of diatomic, aliphatic alcohols, for example ethandiol, propandiol and butandiol, are diols. Diols may also contain a tertiary-bound nitrogen group. Preferred diols containing a tertiary-bound nitrogen group have the general formula:

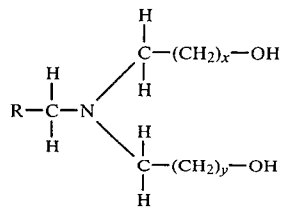

in which R is hydrogen or an alkyl group containing 1–5 carbon atoms, and x is an integer of 0–5 and y is an integer of 0–5.

The most desired compounds are those in which x is 2–3 and y is 2–3. Examples of specific amine compounds are N-methyldiethanolamine, butydiethanolamine and methyldipropanolamine.

The advantages obtainable with the invention are in particular: Control of the flexibility and the reactivity of the polyester resin and their variation are possible by the choice of the dicarboxylic acid and the glycol. The polyester resins according to the invention have no cross-linkable groups, so that the storage stability, flexibility and workability remain ensured. The polyester resins serving as binders can furthermore be applied over large surfaces, so that intimate mixing of the binder with the impregnating resin is readily achieved.

The invention will be explained in the following in greater detail with the aid of several embodiment examples which are in part shown in the drawings.

The mica tape according to FIG. 1, designated as a whole with G, consists of a flexible support foil 1 of polyester fabric with an area weight of about 20 to 25 g/m$^2$. Japan paper or glass fabric can also be used as the support tape 1. A layer 2 of adhesive and accelerator resin is applied as a binder to the support tape 1, with an area weight of about 20 g/m$^2$, for instance, by spraying or brushing. Methyl-ethyl ketone, for example, which evaporates after the application with heat supplied if necessary is suitable as a solvent for the adhesive and accelerator resin. This adhesive and accelerator resin is a polyester resin which contains tertiary-bound nitrogen. It will be described in detail later on. Important is that the adhesive and accelerator resin 2 starts the polyaddition reaction of the hot-setting epoxy impregnating resin mixture but is not subject to aging itself since it contains no epoxy resin compounds. A layer 3 of split mica which has an area weight of about 230 g/m$^2$ is applied over the layer 2 of the adhesive and accelerator resin. The individual scales of mica 3a are embedded in the adhesive layer 2 and overlap each other, so that an insulation layer with high dielectric strength is formed. A further layer 4 of accelerator and adhesive resin is applied over the mica layer 3 and on this adhesive layer 4 is then applied the cover layer 5, likewise consisting of a polyester fabric. The cover layer 5 can also consist of Japan paper or a glass fabric instead of polyester fabric. The mica scales 3a are thus cemented to the support layer 1 and the cover layer 5 and to each other, the viscosity of the layer 2 being chosen so that the mica tape G can be worked, i.e., wrapped, easily. According to a variant, a fine-mica tape can also be used instead of the split-mica tape described, the area weights of the fine mica being about 150 g/m$^2$ and of the adhesive about 8 g/m$^2$. Instead of the polyester fabric as the support tape, a glass fabric with an area weight of about 22 to 27 g/m² is preferably used in the case of the fine-mica tape.

Figure 2:
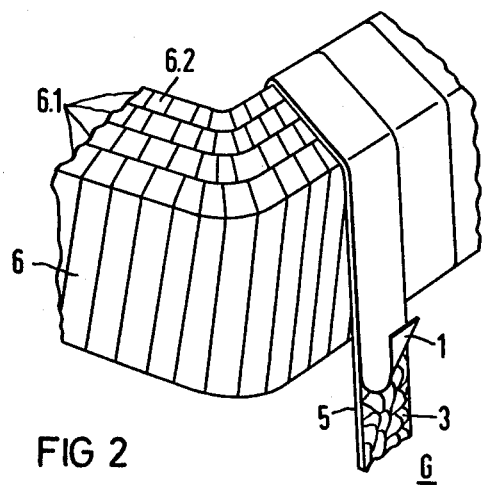

To make the insulating sleeve of the winding bar of an electric machine, the mica tape as per FIG. 1 is wrapped around the winding bar 6 of the electric machine as indicated in FIG. 2. This winding bar 6 consists of individual sub-conductor columns 6.1 each of which is wrapped with a separate sub-conductor insulation 6.2. The columns 6.1, are in turn combined to form the bar 6. After the winding bar 6 is wrapped with the mica tape, the form is impregnated in a vacuum, optionally after first being dried, with a heat-setting epoxy resin mixture of the bi or higher-functional glycidyl ether type or of the epoxy compound and acid anhydride type. The impregnating temperature is about 60° to 70° C., to assure that the viscosity of the epoxy resin mixture during the impregnation is less than 30 cP and therefore, the sleeve wrapped on the winding bar 6 is completely impregnated. Thereupon, the excess impregnating resin mixture is pumped back. It can be used several times more, since its use time (pot life) is several times the time required for an impregnating cycle. The part of the epoxy impregnating resin mixture which is highly liquid at the impregnating temperature and permeates the sleeve wrapped on the winding bar 6, dissolves the accelerator contained in the mica tape G. The share of accelerator in the impregnating resin mixture contained in the wrapped insulating sleeve is about 15%. This accelerator now causes the rapid setting-in of the polyaddition reaction between the epoxy compounds diffused into the wrapped sleeve including the acid anhydride ether, so that gelling the resin components contained in the sleeve begins, a gelling time of 5 to 6 hours generally being desirable. Prior to the end of the gelling time, generally within about one hour after the winding bars have been removed from the impregnating bath, they are placed in a press, the viscosity of the resin then still being low enough so that excess resin can ooze out in the pressing operation. After the gelling process is completed, the winding bars contained in the presses are then taken to the setting apparatus; the setting time can be shortened if the processing temperature in the setting oven is increased to above 100° C.

In the following, three examples for the compositions of the accelerator and adhesive resin 2 and 4 are given to illustrate that the reactivity, the gelling time and the viscosity through setting the nitrogen content are controlled in a simple manner. The examples relate to the so-called polyesterification.

EXAMPLE NO. 1

The basic chemical reaction will first be explained. Dicarbonic acid: Adipic acid, HOOC—(CH₂)₄—COOH, is brought into reaction with glycol, N-methyldiethanolamine, i.e.,

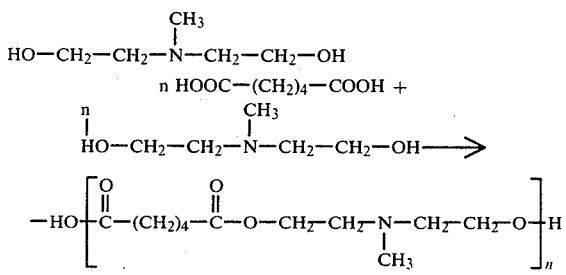

Overall formula for the basic building block determining the properties:

In detail, 145 g adipic acid and 119 g N-methyldiethanolamine were weighed into a three-neck flask. The mixture was pre-condensed for about 12 hours at 100° C. in a nitrogen atmosphere. Thereupon, the condensation water produced was distilled off at 100° C. introducing nitrogen toward the end while applying a water-jet vacuum. The condensation is completed when the amount of water distilled over corresponds substantially to the amount of water produced by condensation.

The gelling time at 70° C. and with 1% accelerator, referred to resin/hardener 1:1, was 5 hours.

Nitrogen content: theoretical, 6.11%; found, 5.39%.
Viscosity (22° C.): 26,500 cP
Viscosity (70° C.): 797 cP, where 1 P(Poise)=0.2 Pa.s(Pascal+second)=1 Ns/m² (Newton second per square meter). By using an amount of glycol without a tertiary-bound nitrogen, one can control the reduction of the nitrogen content in the polyester resin and thereby, the setting of any desired reactivity and gelling time, an example 1 in conjunction with the following examples 2 and 3 shows.

EXAMPLE NO. 2

A gelling time of 6 hours at 70° C. is desired with an accelarator content of 15% referred to the epoxy reson-/acid anhydride mixture (1:1). Through calculation, a required nitrogen content of 0.48% is obtained.

From this, the following recipe is obtained:

Adipic acid: 1 mol
N-methyldiethanolamine: 0.06 mol
Ethylene glycol: 0.94 mol

Preparation 146 g adipic acid, 58.35 g ethylene glycol, 7.15 g N-methyldiethanolamine were weighed into a three-neck flask. The mixture was precondensed for about 12 hours at 100° in a nitrogen atmosphere. Thereupon, the condensation water produced was distilled off at 100° C. with nitrogen added toward the end while applying a water jet vacuum. The condensation is completed when the amount of water about equivalent to the water of condensation is distilled over.

The gelling time at 70° (15% accelerator, referred to resin/hardener 1:1) was 6 hours.

Nitrogen content: 0.48% N (theoretical); 0.46% N (found)
Viscosity (25° C.): crystallized
Viscosity (70° C.): 614 cP

EXAMPLE NO. 3

To improve the workability (application), part of the adipic acid was replaced with methylhexahydrophthalic acid anhydride. The polyester produced is highly viscous and can be applied over an area.

Recipe:
Adipic acid: 0.5 mol
N-methyldiethanolamine: 0.06 mol
ethylene glycol: 0.94 mol
methylhexahydrophthalic acid anhydride: 0.5 mol Nitrogen content: N(theoretical), 0.40%; N (found), 0.41%.

Gelling time (70° C.): 6 hours (15% accelerator referred to resin/hardener 1:1)
Viscosity (22° C.): 600,000 cP=600,000 Mpa sec
Viscosity (70° C.): 2,800 cP=2,800 mPa sec.

Preparation 73 g adipic acid, 58.35 g ethylene glycol, 7.15 N-methyldiethanolamine, 84 g methylhexahydrophthalic acid anhydride are weighed into a three-neck flask. The mixture is precondensed for about 12 hours at 100° C. in a nitrogen atmosphere. Thereupon the condensation water produced is distilled off at 100° C. adding nitrogen toward the end while applying a vacuum. The condensation is completed when the amount of water corresponds to the water of condensation has distilled over.

Dicarboxylic acid anhydrides can be used instead of the dicarboxylic acids. It may also be advantageous if part of the glycol containing the tertiary-bound nitrogen is replaced by a nitrogen-free glycol to adjust the desired reactivity.

There is claimed:

1. Method for the manufacture of high-voltage insulation for electric machines and apparatus by wrapping a mica tape formed by adhering mica to a flexible support foil with a binder resin around the electrical equipment to be insulated and impregnating the electrical equipment having the mica tape wrapped around it with a heat-setting epoxy resin, the improvement comprising employing as said binder-resin a polyester containing a tertiary-bound nitrogen which is effective as an adhesive for the tape and also as an accelerator for the epoxy resin.

2. Method according to claim 1, wherein the polyester is the condensation product of a dicarboxylic acid or its anhydride and a diol containing a tertiary-bound nitrogen group.

3. Method according to claim 2, wherein the dicarboxylic acid or its anhydride contains 4–12 carbon atoms and is an aliphatic saturated hydrocarbon with 2 —COOH groups or the anhydride thereof.

4. Method according to claim 3, wherein the dicarboxylic acid or its anhydride contains 6–8 carbon atoms.

5. Method according to claim 2, wherein the diol has the general formula:

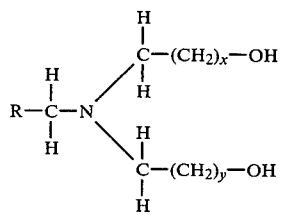

in which R is hydrogen or an alkyl group containing 1–5 carbon atoms, and x is an integer of 0–5 and y is an integer of 0–5.

6. Method according to claim 5, wherein x is 2–3 and y is 2–3.

7. Method according to claim 2, wherein the dicarboxylic acid is adipic acid and the diol is N-methyldiethanolamine and substantially equimolar amounts of the acid and amine are mixed together, maintained at a temperature of at least 100° C. to effect condensation, and the resultant water of condensation distilled off at about 100° C.

8. Method according to claim 2, wherein part of the diol containing a tertiary-bound nitrogen group is replaced by a diol without a tertiary-bound nitrogen group to reduce the reactivity of the polyester as an accelerator.

9. Method according to claim 8, wherein the diol without a tertiary-bound nitrogen group is ethylene glycol.

10. Method according to claim 2, wherein part of the dicarboxylic acid or its anhydride is replaced by a second dicarboxylic acid or its anhydride having a different molecular structure to change the viscosity of the condensation product.

11. Method according to claim 10, wherein the first dicarboxylic acid or its anhydride is a saturated aliphatic compound and the second dicarboxylic acid or its anhydride is a saturated cyclic compound.

12. Method according to claim 11, wherein the first dicarboxylic acid is adipic acid and the second dicarboxylic acid anhydride is methyl hexylhydrophthalic acid anhydride.

13. Mica tape for manufacturing an insulating sleeve impregnated with a hot-setting epoxy impregnating resin mixture for electric conductors, especially for the winding bars and coils of electric machines formed of mica scales applied on a flexible support and cemented to the support and to each other by means of a binder serving as the adhesive and also as the accelerator for the epoxy resin mixture when impregnated with the epoxy resin mixture, said adhesive and accelerator binder being a polyester resin containing a tertiary-bound nitrogen as part of its molecular structure.

14. Mica tape according to claim 13, wherein the polyester is the condensation product of a dicarboxylic acid or its anhydride and a diol containing a tertiary-bound nitrogen group.

15. Mica tape according to claim 14, wherein the dicarboxylic acid or its anhydride contains 4–12 atoms and is an aliphatic saturated hydrocarbon with 2 —COOH groups or the anhydride thereof.

16. Mica tape according to claim 15, wherein the dicarboxylic acid or its anhydride contains 6–8 carbon atoms.

17. Mica tape according to claim 14, wherein the diol has the general formula:

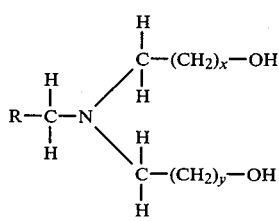

in which R is hydrogen or an alkyl group containing 1–5 carbon atoms, and x is an integer of 0–5 and y is an integer of 0–5.

18. Mica tape according to claim 17, wherein x is 2–3 and y is 2–3.

19. Mica tape according to claim 14, wherein the dicarboxylic acid is adipic acid and the diol is N-methyldiethanolamine and substantially equimolar amounts of the acid and amine are mixed together, maintained at a temperature of at least 100° C. to effect condensation, and the resultant water of condensation distilled off at about 100° C.

20. Mica tape according to claim 14, wherein part of the diol containing a tertiary-bound nitrogen group is replaced by a diol without a tertiary-bound nitrogen group to reduce the reactivity as an accelerator of the polyester.

21. Mica tape according to claim 20, wherein the diol without a tertiary-bound nitrogen group is ethylene glycol.

22. Mica tape according to claim 14, wherein part of the dicarboxylic acid or its anhydride is replaced by a second dicarboxylic acid or its anhydride having a different molecular structure to change viscosity of the condensation product.

23. Mica tape according to claim 22, wherein the first dicarboxylic acid or its anhydride is a saturated aliphatic compound and the second dicarboxylic acid or its anhydride is a saturated cyclic compound.

24. Mica tape according to claim 23, wherein the first dicarboxylic acid is adipic acid and the second dicarboxylic acid anhydride is methyl hexylhydrophthalic acid anhydride.

* * * * *